Feb. 13, 1951 — R. H. VOGEL — 2,541,312
SWINGABLE VERTICAL MASTER BRAKE CYLINDER
Filed June 4, 1945
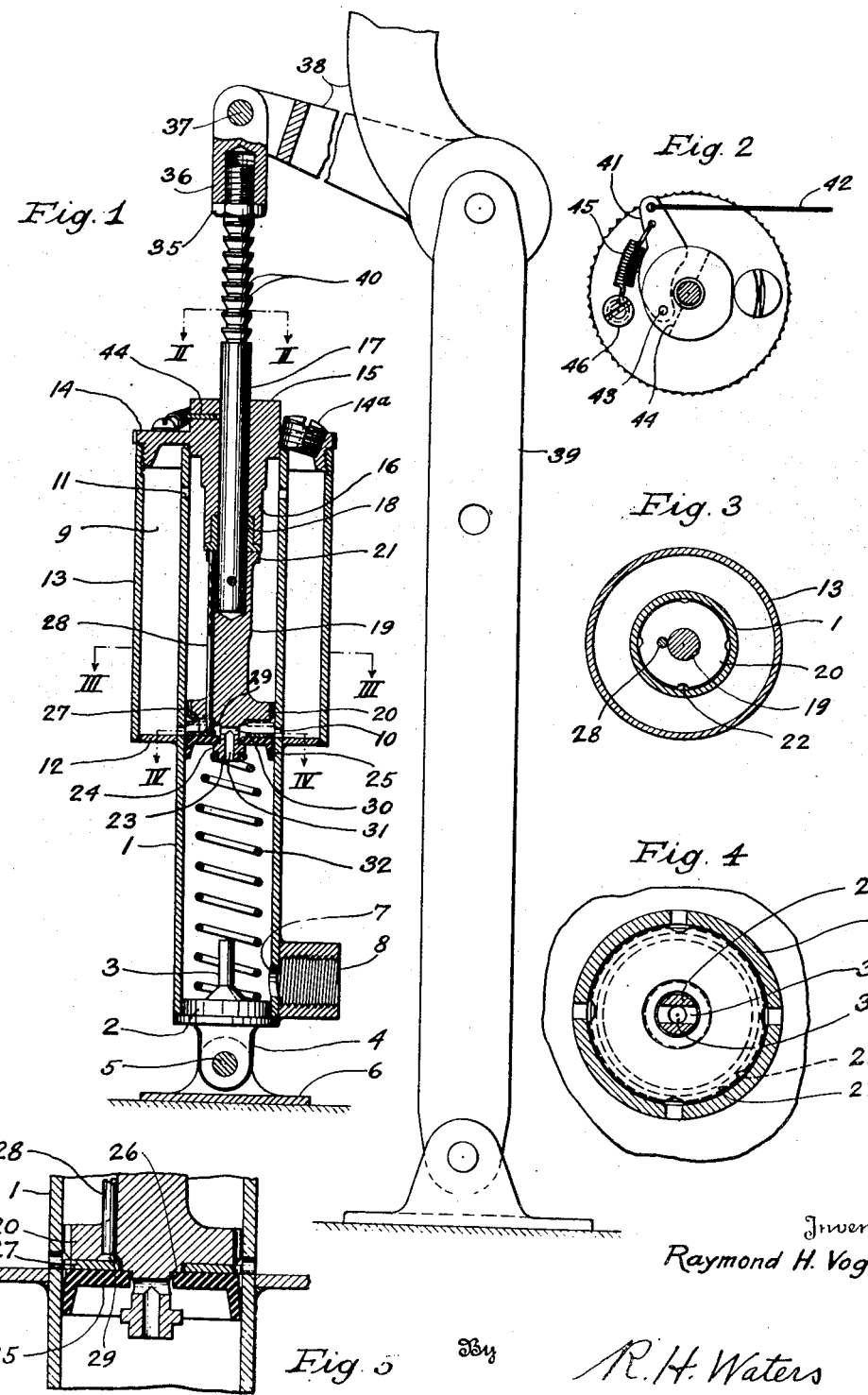
Inventor
Raymond H. Vogel
By R. H. Waters
Attorney Patented Feb. 13, 1951

2,541,312

UNITED STATES PATENT OFFICE 2,541,312

SWINGABLE VERTICAL MASTER BRAKE CYLINDER

Raymond H. Vogel, Akron, Ohio, assignor to Wingfoot Corporation, Akron, Ohio, a corporation of Delaware Application June 4, 1945, Serial No. 597,479

8 Claims. (Cl. 60—54.6)

This invention relates to hydraulic master brake cylinders for use in airplanes and other vehicles, and, in particular, to that type of cylinder which is installed in substantially vertical position.

Master brake cylinders used on airplanes are generally employed in combination with the rudder control foot lever or bar to which is swingably attached a separately operable brake pedal coacting with the master brake cylinder which is swingable parallel with the rudder control foot lever. The brake pedal can be operated by itself in any position of the rudder control foot lever and also together with this lever. This general arrangement is well known in aircraft construction. However, master cylinders heretofore used for this and other purposes have been relatively complicated in construction, difficult to service and repair, and high in cost and weight.

It is the general object of the invention to avoid and overcome the foregoing and other difficulties of and objections to prior art practices by the provision of an improved, relatively inexpensive, light weight, efficient and long-wearing master cylinder capable of a wide variety of uses, but particularly adapted for use in a vertical position in conjunction with an airplane rudder bar.

Another object of the invention is to provide a master brake cylinder having an operating valve floatingly combined with a piston of loose fit in the cylinder and which, in the pressure stroke, provides a seal for the piston, but permits fluid to pass in the return stroke.

Another object of the invention is the provision of an improved master cylinder for brakes and the like including new and useful means for automatically replenishing fluid in the cylinder from an associated reservoir.

Another object of the invention is the provision of a brake cylinder, as described, wherein the flat face of the loose piston valve is uniformly supported by the piston during the pressure stroke to avoid deformation.

Another object of the invention is to provide a master cylinder wherein the piston sealing cup, in its movement, does not have to pass oil passages in the cylinder walls which might injure the sealing lip of the cup.

Another object of the invention is to make the pressure cylinder and the oil reservoir out of drawn tubing to keep machining to a minimum and to avoid scrapping of castings due to sand holes.

Another object of the invention is to utilize the floatable piston seal as a fluid check valve.

Another object of the invention is to provide a brake cylinder construction easy to assemble and disassemble.

Another object of this invention is the provision of a simple device in association with the piston to keep the brakes applied while parking the vehicle.

For a better understanding of the invention, reference should be had to the accompanying drawing, wherein Fig. 1 is a longitudinal cross-sectional view of one embodiment of the invention showing the piston in its normal position.

Fig. 2 is a cross-sectional view taken on line II—II of Fig. 1.

Fig. 3 is a cross-sectional view taken on line III—III of Fig. 1.

Fig. 4 is a cross-sectional view, on a larger scale, taken on line IV—IV of Fig. 1.

Fig. 5 is a fragmentary view of Fig. 1 on a larger scale, but showing the piston in sealed condition.

Although the principles of the invention are broadly applicable to hydraulic brakes in general, the invention is usually employed in conjunction with airplane brakes and has been so illustrated and described.

With specific reference to the form of the invention illustrated in the drawing, the numeral 1 indicates a pressure cylinder preferably made of calibrated steel tubing cut to length, the lower end of which is closed by a plug or head 2 welded thereto and having on the inside an extension 3, of smaller diameter, serving as a piston stop, and an outside extension 4 which is pivotally connected by a pin 5 to a bracket 6 in fixed position within an airplane or other vehicle. At the bottom the cylinder 1 is provided with a side outlet 7, and with a threaded extension 8 welded to the cylinder and adapted to be connected to a fluid pressure line leading to the brake motors (not shown). At the upper portion, usually about the upper half, the cylinder is surrounded by an operating fluid reservoir 9 and interconnected therewith by fluid passages 10 and air vents 11. This reservoir consists of an annular sheet metal bottom 12 welded between the cylinder 1 and the wall 13, also preferably made of calibrated steel tubing. The threaded cover 14, provided with a plug 14a containing a vent hole, screws into the top of the reservoir and closes and simultaneously centers the top of the pressure cylinder 1.

The cover 14, which is preferably made of light alloy, is provided with axially-aligned bosses 15 and 16 at the outside and inside respectively. A piston rod 17 extends slidably through the cover 14 and is guided by a bushing 18 preferably made of bronze and pressed into the inner boss 16.

The rod 17, secured by a pin or otherwise in the extension 19 of the piston 20, is limited in its outward movement by the shoulder 21 of the extension 19. To assure, during the brake release stroke, ready fluid flow from the low to the high pressure side of the cylinder, the piston 20, slightly chamfered at the pressure side, is made a trifle smaller in diameter than the cylinder 1 and in addition may be provided for the same purpose with a number of longitudinal grooves 22 distributed around its circumference. At its bottom the piston is provided with a valve stem 23 integral therewith, including near its end a flange 24 over which is slipped a valve cup 25 made of rubber or similar material. This cup is annularly spaced from the stem 23 and movable longitudinally thereof, but under pressure forms, with its lip, a seal against the cylinder with its outer face against the shoulder 26 of the stem 23 to shut off communication between low and high pressure sides of the cylinder. In order to obtain positive separation of the valve cup from the piston at its return stroke, that is, to break the seal between piston and cylinder, a stiff disk 27 having the same diameter and similar grooves or notches as the pistons and having a thickness not greater, rather smaller, than the height of the shoulder 26 is inserted therebetween. When the piston approaches its uppermost position a push rod 28 provided with a countersunk head 29, passes, partially exposed, through the piston and its extension and protrudes slightly over the top of the extension 19 when the valve cup is seated on the piston disk 27, pushes the disk off the piston and, thereby, the valve or piston cup 25, so that fluid can flow between piston and disk and through the clearance between disk and valve stem 23 and can communicate with the reservoir, and through holes 30 and 31 in the valve stem with the high pressure portion of the cylinder. The uppermost position of the piston is so determined that the lip of the valve or piston cup 25 never reaches the fluid passages 10 in the cylinder 1 to thus prevent local injury to the cup by chafing on these passages. In order to hold the piston in its normal, uppermost position, a spring 32 is inserted between the cylinder head 2 and the flange 24 of the valve stem.

To the outer end of the piston rod is adjustably attached, by means of a lock nut 35, an eye nut 36. This permits easy installation of the whole cylinder assembly. The eye nut is hinged by a pin 37 to the brake pedal lever 38 by which the master cylinder and through it the brakes of the vehicle are operated. In airplanes, the lever 38 is usually combined in well known manner with a rudder footbar or lever 39 which moves parallel with the swingable cylinder assembly in such a way that the brake pedal lever does not operate the cylinder piston when swung together with the rudder foot lever, except when directly applied by the operator tilting his toes.

Combined with the master cylinder is a parking device forming a part of the invention, whereby return movement of the piston can be prevented and the brakes kept locked during parking of an airplane or other vehicle. For this purpose a portion of the outer end of the piston rod is provided with closely spaced circumferential grooves forming annular shoulders 40 to be engaged by a locking lever 41 mounted on the cover 14 and swingable by a remotely-operated control cable 42 about a pin 43 in a slot guide 44. Normally the lever 41 is held in retracted position by a tension spring 45 fastened by a screw 46 to the cover. However, when in use, the lever 41 is moved into engagement with one of the shoulders 40 of the piston rod by operating the control cable 42 and is held in this engagement by the hydraulic pressure in the brake system reacting against the piston or by the cable.

Even though it is believed the operation of the apparatus will be apparent from the foregoing description, a brief review thereof will now be made for purposes of summary and simplification.

In operating the master cylinder, the piston is pushed down against the spring 32 by the foot pedal 38 whereby the flat upper surface of the floatable valve cup 25 will be pressed against the shoulder 26 of the valve stem 23 and against the disk 27, respectively, whereby the push rod 28 is made to protrude over the upper end of the extension 19 and at the same time the cup's circumferential lip will make a perfect seal against the cylinder wall. Thus, fluid under pressure will be forced out through the outlet extension 8 to the wheel brakes. Upon releasing the foot pressure on the pedal 38 the piston is pushed back by the spring 32 and the cup together with the disk unseat themselves from the piston, or if not, are pushed away therefrom by the push rod 28 when it hits the bushing 18 and comes to lie against the flange 24 of the valve stem. Thereby, the fluid will flow past the piston including the sealing cup, the soft lip of which will be pushed inwardly, as well as through the annular space between the cup and piston extension and through the passages 30 and 31 in the valve stem 23 into the lower portion of the cylinder.

An important feature of the invention is the foregoing described arrangement of parts which automatically effects a filling of the master cylinder below the piston with oil from the reservoir 9 upon each return stroke of the piston. This, of course, is accomplished by a gravity flow of the liquid through the passages 10 and/or 11, down through the grooves 22 in the piston 20 (in the case of the fluid above the piston) and down through the passages 30 and 31 to a position below the piston. This replenishment of fluid below the piston compensates for any leakage losses in the brake or hydraulic system. The vented plug 14a, open to the atmosphere, permits the gravity flow from the reservoir 9 in the manner just described.

In addition to the important functional result set forth in the preceding paragraph, the arrangement of parts results in the piston acting as a dashpot to prevent too rapid a snap of the piston under the action of the spring 32. That is, since the piston 20 substantially fills the cylinder 1 and has substantially confined fluid on both sides thereof, which fluid has limited flow passages through the piston, the piston can move upwardly of the cylinder only at a relatively slow rate.

In its pressure stroke the piston can be held at any desirable position by operating the cable 42 to move the locking lever 41 into engagement with the shoulder 40 of the piston rod 17 thereby to keep the brakes locked while parking. It will be noted that because of the completely closed construction of the pressure portion of the cylinder there can be no fluid leakages so that the parking brake is very effective.

It will be recognized that the objects of the invention, namely, the provision of a simple, inexpensive, reliable and durable hydraulic master cylinder, have been fully achieved.

While in accordance with the patent statutes one best known embodiment of the invention has been illustrated and described in detail, it is to be particularly understood that the invention is not limited thereto or thereby but that the inventive scope is defined in the appended claims.

I claim:

1. A hydraulic substantially vertical pressure mechanism adapted to be operated in connection with a hydraulic brake system, comprising a tubular pressure cylinder closed at the bottom and pivotally mounted at its bottom end to a fixed position, a tubular fluid reservoir integral with and concentric with said cylinder, the open ends of said reservoir and said cylinder being substantially flush, a removable cover for closing both of said open ends, a piston rod extending through said cover, a piston having a loose fit in said cylinder fastened to said rod, a valve stem, including a flange near the outer end thereof, extending from the bottom of said piston and having a central fluid passage, a sealing cup longitudinally movable on said valve stem and radially spaced therefrom, said cup sealing said piston in the pressure stroke against the high pressure portion of said cylinder and shutting off the flow through said passages and in the return stroke permitting fluid to pass around its circumference as well as through said passages from the low pressure portion to the high pressure portion of said cylinder, an extension on said piston in contact with said cover determining its uppermost position in said cylinder, port means connecting said fluid reservoir with said pressure cylinder and located in the low pressure portion of said pressure cylinder upon the pressure stroke of said piston, and a spring for holding said piston in this position.

2. A master cylinder of the substantially vertical type mounted between a fixed and a movable support adapted for operating hydraulic vehicle brakes, comprising a pressure cylinder, a fluid reservoir integral with and surrounding a portion of and having fluid communication with said cylinder, said cylinder and said reservoir being both open at the top, a removable cover for closing said cylinder and said reservoir, a piston rod passing through and being guided in said cover, a piston including a valve stem having a flange near the outer end thereof, and a sealing cup inserted between said flange and piston and being longitudinally movable therebetween and having a spacing between the cup and valve stem, said cup cooperating with said piston by sealing it when the cylinder is under pressure and permitting fluid to pass therebetween when the pressure is released.

3. A substantially vertical master brake cylinder, comprising a tubular pressure cylinder closed at and swingable about its bottom end, an operating fluid reservoir surrounding and being integral with said pressure cylinder communicating therewith by air and fluid passage holes, a cover screwed into said reservoir adapted to simultaneously close the top of the pressure cylinder, a spring-supported piston having an upward extension movable in said cylinder, a sealing cup cooperating with said piston and being loosely attached thereto, said cup, besides being a sealing means for the piston, acting as a check valve between the high pressure and the low pressure portion of said cylinder and movable only below said fluid passages, a piston rod attached to said piston passing through and guided in said cover, the upward movement of which is arrested by the contact of said piston extension with said cover, and an end piece adjustable on the outer end of said piston rod and operatively connected to a means for operating said piston in said cylinder.

4. In a substantially vertical brake master cylinder, a spring-supported piston movable in said cylinder, a valve stem having a center bore and radial bores communicating with each other extending downwardly from said piston and being provided with a flange near the outer end thereof and having a shoulder adjacent said piston, a rubber-like valve cup loosely attached to said stem and movable longitudinally thereof, a stiff disk loosely fitting around said shoulder and against the piston face and being of a thickness substantially that of the height of said shoulder, said cup resting during the pressure stroke against said shoulder and said disk as a fluid seal for said piston, and means for positively separating said disk and said cup from the piston just before the piston reaches, in the release stroke, its uppermost position to permit fluid flow through said valve stem between the low and high pressure portion of said cylinder.

5. In a substantially vertical brake master cylinder, a spring-supported piston provided with an upper extension movable in said cylinder, a stop for the uppermost piston position, a valve stem having a center bore and radial bores communicating with each other extending downwardly from said piston and being provided with a flange near the outer end thereof and having a shoulder adjacent said piston, a rubber-like valve cup loosely attached to said stem and movable longitudinally thereof, a stiff disk, loosely fitting around said shoulder and against the piston face, being of a thickness substantially that of the height of said shoulder, said cup resting during the pressure stroke against said shoulder and said disk as a fluid seal for said piston, and a push rod for positively separating said disk and said cup from the piston just before the piston reaches, in the release stroke, its uppermost position to permit fluid flow through said valve stem between the low and high pressure portion of said cylinder, said push rod being slightly longer than the total length of said upper extension and said piston for protruding its upper end over said extrusion when the piston is pushed downwardly and being pushed against said disk for separating it and said valve cup from the piston when it hits said piston stop for permitting fluid flow through said valve stem between the low and high pressure portion of said cylinder.

6. In a substantially vertical brake master cylinder a spring supported piston provided with a valve stem carrying a flange near the outer end thereof movable in said cylinder, a single sealing cup on said piston loosely attached to said valve stem longitudinally movable thereof and annularly spaced from said stem, said cup acting as a sealing means for the piston and as a check valve to control the flow of the operating fluid between the high pressure portion and the low pressure portion of said cylinder, and release means for positively breaking the seal of said sealing cup on a complete return stroke of said piston, said release means including a stiff disk loosely associated with said valve stem intermediate said piston and said sealing cup, and a push rod that engages said disk to force said sealing cup out of sealing association with said piston.

7. A brake master cylinder of the substantially vertical type composing a cylinder having a pressure discharge opening at the bottom, a piston dividing said cylinder into a high pressure discharge portion and a low pressure fluid reservoir portion, said piston having a loose fit in the cylinder whereby fluid may readily pass by the piston, the piston having a plurality of longitudinal grooves around its periphery, an integral valve stem extending downwardly from the center of said piston and projecting into the high pressure portion of the cylinder, the stem having a central passage for fluid adapted to be connected to the longitudinal grooves on the piston, an annular sealing cup slidably carried on the valve stem, for movement to and from the piston and slidably engaging the cylinder wall, a flange on said valve stem limiting the downward movement of the annular sealing cup upon the return stroke of the piston, and a flat sealing portion on the piston limiting the upward movement of the cup against the piston upon the pressure stroke of the piston for cutting off the passage of fluid between the longitudinal grooves on the piston and the passage in the valve stem.

8. A brake master cylinder of the substantially vertical type composing a cylinder having a pressure discharge opening at the bottom, a piston dividing said cylinder into a high pressure discharge portion and a low pressure fluid reservoir portion, said piston having a loose fit in the cylinder whereby fluid may readily pass by the piston, the piston having a plurality of longitudinal grooves around its periphery, an integral valve stem extending downwardly from the center of said piston and projecting into the high pressure portion of the cylinder, the stem having a central passage for fluid adapted to be connected to the longitudinal grooves on the piston, an annular sealing cup slidably carried on the valve stem, for movement to and from the piston and slidably engaging the cylinder wall, a flange on said valve stem limiting the downward movement of the annular sealing cup upon the return stroke of the piston, and a fixed push rod extending slidably through the piston and engaging said annular sealing cup on a complete return stroke of said piston to move the cup towards the flange end of the valve stem.

RAYMOND H. VOGEL.

REFERENCES CITED

The following references are of record in the file of this patent:

UNITED STATES PATENTS

| Number | Name | Date |
| --- | --- | --- |
| 508,490 | Snyder | Nov. 14, 1893 |
| 730,065 | Wilson | June 2, 1903 |
| 1,399,591 | Uffert | Dec. 6, 1921 |
| 1,963,114 | Bowen | June 19, 1934 |
| 1,997,117 | Quintavalle | Apr. 19, 1935 |
| 2,018,325 | Schnell | Oct. 22, 1935 |
| 2,059,082 | Brady | Oct. 27, 1936 |
| 2,115,174 | Majneri | Apr. 26, 1938 |
| 2,120,073 | Majneri | June 7, 1938 |
| 2,134,509 | Frank | Oct. 25, 1938 |
| 2,152,485 | Kindl | Mar. 28, 1939 |
| 2,152,499 | Rasmussen | Mar. 28, 1939 |
| 2,199,863 | Wehr | May 7, 1940 |
| 2,310,976 | Masteller | Feb. 16, 1943 |
| 2,352,920 | Stevens | July 4, 1944 |
| 2,374,235 | Roy | Apr. 24, 1945 |
| 2,447,142 | Smith | Aug. 17, 1948 |

FOREIGN PATENTS

| Number | Country | Date |
| --- | --- | --- |
| 338,918 | Great Britain | Dec. 1, 1930 |